US011789202B2

(12) United States Patent
Ji et al.

(10) Patent No.: US 11,789,202 B2
(45) Date of Patent: Oct. 17, 2023

(54) HYBRID INTEGRATED OPTOELECTRONIC CHIP AND METHOD OF MANUFACTURING THE SAME

(71) Applicant: InnoLight Technology (Suzhou) LTD., Jiangsu (CN)

(72) Inventors: Mengxi Ji, Jiangsu (CN); Xianyao Li, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 142 days.

(21) Appl. No.: 17/147,637

(22) Filed: Jan. 13, 2021

(65) Prior Publication Data

US 2021/0215878 A1 Jul. 15, 2021

(30) Foreign Application Priority Data

Jan. 13, 2020 (CN) .......................... 202010029417.6

(51) Int. Cl.
*G02B 6/26* (2006.01)
(52) U.S. Cl.
CPC ..................................... *G02B 6/26* (2013.01)
(58) Field of Classification Search
None
See application file for complete search history.

(56) References Cited

U.S. PATENT DOCUMENTS

| 5,621,837 A * | 4/1997 | Yamada | G02B 6/4232 |
| | | | 385/88 |
| 2005/0031291 A1* | 2/2005 | Gao | G02B 6/423 |
| | | | 385/142 |
| 2022/0187550 A1* | 6/2022 | Baudot | G02B 6/12004 |

FOREIGN PATENT DOCUMENTS

| CN | 109579817 A | 4/2019 |
| CN | 109669248 A | 4/2019 |
| CN | 208953815 U | 6/2019 |
| CN | 110161625 A | 8/2019 |
| CN | 110187526 A | 8/2019 |

* cited by examiner

*Primary Examiner* — Chad H Smith
(74) *Attorney, Agent, or Firm* — Finnegan, Henderson, Farabow, Garrett & Dunner, LLP

(57) ABSTRACT

A hybrid integrated optoelectronic chip including an optoelectronic chip and a silicon photonic chip, a material of the optoelectronic chip being different from a material of the silicon photonic chip. The optoelectronic chip includes at least one first waveguide. The silicon photonic chip includes at least one second waveguide and an installation recess. The optoelectronic chip is installed in the installation recess, and the first waveguide is optically connected to the second waveguide.

20 Claims, 5 Drawing Sheets

HYBRID INTEGRATED OPTOELECTRONIC CHIP AND METHOD OF MANUFACTURING THE SAME

CROSS-REFERENCE TO RELATED APPLICATION

This application is based upon and claims priority to Chinese Patent Application 202010029417.6, filed on Jan. 13, 2020, the entire content of which is incorporated herein by reference.

FIELD OF THE DISCLOSURE

The present application relates to the field of semiconductor chips and, more particularly, to a hybrid integrated optoelectronic chip and a method of manufacturing the same.

BACKGROUND

Due to compatibility of silicon optical benches with conventional CMOS technology and large refractive index differences, silicon optical benches provide advantages, such as easy to manufacture in mass production and easy to integrate, and are highly suitable for the manufacturing of passive devices and photodetectors. Therefore, silicon-based optoelectronic chips are especially important in high-speed optical communication. However, when silicon is used to realize an optical modulator, basic characteristics of silicon lead to deficiencies, such as low modulation efficiency, high capacitance, and limited bandwidth. Thus, silicon optical benches have weaknesses when used to manufacture optical modulators. In order to leverage advantages provided by silicon optical benches and at the same time address problems such as low modulation efficiency, high capacitance, and limited bandwidth of optical modulators manufactured with silicon optical benches, currently available technology proposes a solution that introduces another material, such as lithium niobate thin film, onto a silicon optical bench.

At present, a common method of combining a lithium niobate thin film and a silicon photonic chip is bonding. In other words, an entire lithium niobate thin film is bonded onto a silicon optical wafer with benzocyclobutene (BCB) resin or silicon dioxide used in between to combine them by intermolecular forces.

Method of Integrating Silicon-Based Lithium Niobate Thin Film Electro-Optic Modulator Array (Chinese Application No. 201910410940.0), a patent application filed in China on May 17, 2019, and published as CN 110161625 A on Aug. 23, 2019, discloses a method of integrating a silicon-based lithium niobate thin film electro-optic modulator array. In this method, a metal electrode is deposited on a silicon waveguide layer, then a lithium niobate thin film layer is adhered onto the silicon waveguide layer, and finally a metal electrode is deposited on the lithium niobate thin film layer. In the Chinese patent application, a silicon waveguide comprises all beam splitters and optocouplers of electro-optic modulators in an arrayed arrangement, input ends of the beam splitters are incident light portals, and output ends of the optocouplers are modulated light output portals. All optical output portals and optical input portals between the modulators may be connected to one another to form a structure of cascade connections, parallel connections, or mixed connections. The lithium niobate thin film layer is etched to form a periodic ridge-shaped structure, and the optocouplers on the silicon waveguide layer are grating couplers or evanescent wave couplers. Since there are a waveguide on the lithium niobate thin film layer and a waveguide on a silicon waveguide layer, optical connections are realized by means of the grating couplers or evanescent wave couplers between the waveguide on the silicon waveguide layer and the waveguide on the lithium niobate thin film layer.

The array-style integration method disclosed in the aforementioned Chinese patent application increases production efficiency for silicon-based lithium niobate thin film electro-optic modulator arrays to a certain extent. However, when aligning ridge waveguide arrays on the lithium niobate thin film layer with each coupler on the silicon waveguide, realizing the alignment of a plurality of couplers and a plurality of ridge waveguide arrays at the same time is difficult. And, the ridge waveguides on the lithium niobate thin film layer and the grating couplers or evanescent wave couplers on the silicon waveguide layer are in different stacked layers, resulting in increased alignment difficulty, difficulty in actual manufacturing, and low production efficiency. Additionally, in the aforementioned integration method, it is only the manufactured lithium niobate thin film layer of the ridge waveguides that is adhered onto the silicon waveguide layer, and a metal electrode then needs to be manufactured on the lithium niobate thin film layer after completion of the adhering. Thus, this technology has many steps and is not conducive to the improvement of production efficiency.

SUMMARY

One embodiment of the present disclosure provides a hybrid integrated optoelectronic chip, comprising:
an optoelectronic chip comprising at least one first waveguide; and
a silicon photonic chip comprising at least one second waveguide and an installation recess, a material of the optoelectronic chip being different from a material of the silicon photonic chip.

The optoelectronic chip is installed in the installation recess, and the first waveguide is optically connected to the corresponding second waveguide.

Another embodiment of the present disclosure also provides a hybrid integrated optoelectronic chip, comprising:
an optoelectronic chip comprising at least one first waveguide; and
a silicon photonic chip comprising at least one second waveguide and an installation recess;
A first position-setting structure is disposed on the optoelectronic chip, and a second position-setting structure is disposed on the silicon photonic chip.

The optoelectronic chip is installed in the installation recess. The first position-setting structure and the second position-setting structure engage to set a position of the optoelectronic chip so that the first waveguide is aligned with the second waveguide.

Still another embodiment of the present disclosure provides a method of manufacturing a hybrid integrated optoelectronic chip, the method comprising the following steps:
forming a silicon photonic chip and an optoelectronic chip, the optoelectronic chip comprising at least one first waveguide, the silicon photonic chip comprising at least one second waveguide, a material of the optoelectronic chip being different from a material of the silicon photonic chip;
forming an installation recess on the silicon photonic chip; and securing and installing the optoelectronic chip into the installation recess so that the first waveguide is optically connected to the second waveguide.

A further embodiment of the present disclosure provides another method of manufacturing a hybrid integrated optoelectronic chip, the method comprising the following steps:

forming a silicon photonic chip and an optoelectronic chip, the optoelectronic chip comprising at least one first waveguide, the silicon photonic chip comprising at least one second waveguide;

forming a first position-setting structure on the optoelectronic chip;

forming a second position-setting structure and an installation recess on the silicon photonic chip;

securing and installing the optoelectronic chip into the installation recess, the first position-setting structure working engaging with the second position-setting structure so that the first waveguide and the second waveguide are aligned with each other; and optically connecting the first waveguide to the second waveguide.

DETAILED DESCRIPTION

Figure 1:
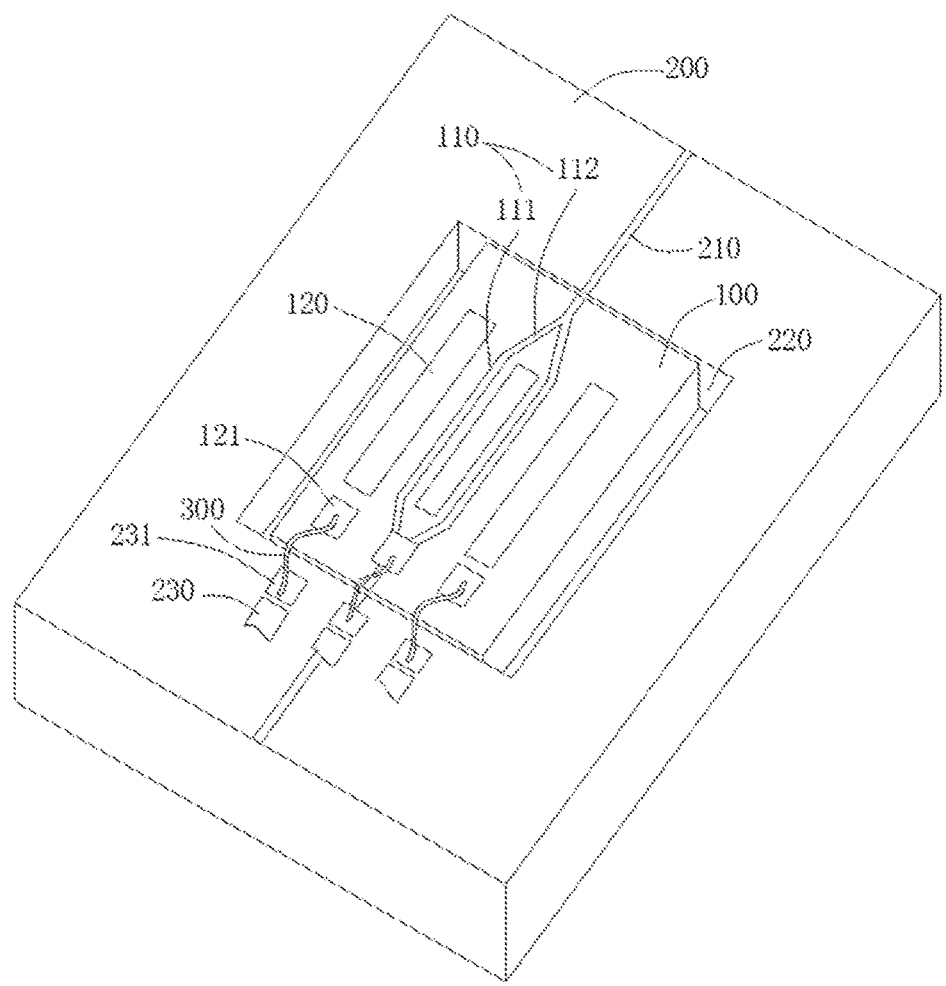
FIG. 1 is a structural diagram of a hybrid integrated optoelectronic chip according to a first embodiment of the present disclosure.

The text below provides a detailed description of the present disclosure in conjunction with specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another member or layer or "connected to" another member or layer, it may be directly above the other member or layer or directly connected to the other member or layer, or there may be an intermediate component or layer.

By introducing a chip of another material to a silicon optical bench, this application provides a hybrid integrated optoelectronic chip that integrates another material on a silicon photonic chip and provides a method of manufacturing the hybrid integrated optoelectronic chip. For illustrative purpose, the description below describes a lithium niobate thin film modulator integrated onto a silicon photonic chip.

The present disclosure provides a hybrid integrated optoelectronic chip and a method of manufacturing the same, which addresses the problem of insufficient bandwidth in a silicon-based modulator while preserving advantages of a silicon photonic chip in integrating passive and active devices, enabling easier manufacturing and an effective improvement in production efficiency.

First Embodiment

Figure 2:
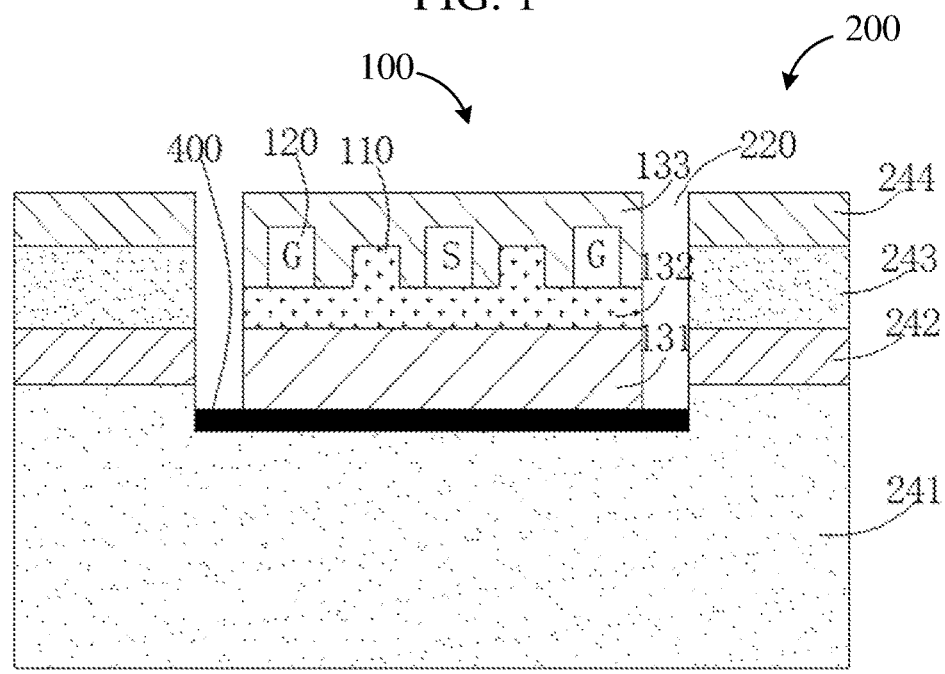
FIG. 2 is a cross-sectional view of the hybrid integrated optoelectronic chip in FIG. 1.

FIG. 1 is a structural diagram of a hybrid integrated optoelectronic chip 1000 according to a first embodiment of the present disclosure. FIG. 2 is a cross-sectional view of the hybrid integrated optoelectronic chip 1000 in FIG. 1. As illustrated in FIG. 1 and FIG. 2, the first embodiment provides a hybrid integrated optoelectronic chip 1000 comprising an optoelectronic chip 100 and a silicon photonic chip 200. The material of the optoelectronic chip 100 is different from the material of the silicon photonic chip 200. Here, the material of the optoelectronic chip 100 being different from the material of the silicon photonic chip 200 means that the primary materials of the aforementioned two chips 100 and 200 are different, not that the two chips 100 and 200 do not have any material in common. For example, the optoelectronic chip 100 is primarily made of lithium niobate, and the silicon photonic chip 200 is primarily made of silicon. Here, the optoelectronic chip 100 is a lithium niobate thin film modulator. In other embodiments, the optoelectronic chip 100 may alternatively be a modulator made of another material or an optoelectronic chip of another function. For example, the optoelectronic chip 100 may be made of a III-V material, or the optoelectronic chip 100 may be a photoelectric detector or a laser.

In the first embodiment, the optoelectronic chip 100 (the lithium niobate thin film modulator) comprises, stacked sequentially, a silicon dioxide base layer 131, a lithium niobate waveguide layer 132, a silicon dioxide cover layer 133, and a first electrode 120 disposed in the silicon dioxide cover layer 133. In the first embodiment, GSG (ground-signal-ground) electrodes are used as an example for the first electrode 120. That is, the first electrode 120 comprises a signal electrode and two ground electrodes. A first waveguide 110 is disposed in the lithium niobate waveguide layer 132. In the first embodiment, the first waveguide 110 comprises two modulation zone waveguides 111 in the middle and two Y-shaped waveguides 112 at two opposite ends of modulation zone waveguides 111. The silicon photonic chip 200 comprises, stacked sequentially, a silicon substrate layer 241, a buried layer 242, a silicon top layer 243, and a cover layer 244. A second waveguide 210 is disposed in the silicon top layer 243. A second electrode 230 is disposed in the cover layer 244. The second electrode 230 comprises three electrodes corresponding to the GSG electrodes on the optoelectronic chip 100, respectively. An installation recess 220 is disposed on the silicon photonic chip 200 and divides the second waveguide 210 into an input segment and an output segment. Only a portion of the silicon photonic chip 200 is shown in FIG. 1. Other waveguides and electrodes as well as active and passive devices, such as a photodetector or a wavelength division multiplexer, may be integrated onto the complete silicon photonic chip 200.

The optoelectronic chip 100 is installed in the installation recess 220. An optical signal passes through the input segment of the second waveguide 210 before entering into the first waveguide 110. The optical signal is modulated by an electrical signal on the first electrode 120 as the optical signal passes through the modulation zone waveguide 111 of the first waveguide 110, and then the optical signal is outputted through the first waveguide 110 before entering into the output segment of the second waveguide 210. In the first embodiment, a glue layer 400 may be applied between a bottom portion of the optoelectronic chip 100 and a bottom of the installation recess 220 to adhere the optoelectronic chip 100 into the installation recess 220, the optoelectronic chip 100 being partially or entirely embedded in the installation recess 220. In other embodiments, alternatively, glue may be placed between the optoelectronic chip 100 and a wall of the installation recess 220 to adhere the optoelectronic chip 100. Glue of the glue layer may be a heat curable glue or a UV curable glue. Three solder pads 121 electrically connected to the GSG electrodes on the optoelectronic chip 100, respectively, are disposed on an upper surface of the optoelectronic chip 100. Once the optoelectronic chip 100 is secured and installed, gold wires 300 are used to electrically connect the solder pads 121 of the first electrode 120 on the optoelectronic chip 100 to corresponding solder pads 231 of the second electrode 230 on the silicon photonic chip 200, and then the second electrode 230 on the silicon photonic chip 200 is electrically connected to an external circuit or power source. In other embodiments, alternatively, electrical connection between the solder pads 231 and the second electrode 230 may be realized by means of solder joints. Or, the solder pads 121 of the first electrode 120 are disposed at a bottom surface of the optoelectronic chip 100, the solder pads 231 of the second electrode 230 are disposed at the bottom of the installation recess 220, and the first electrode 120 and the second electrode 230 are electrically connected by means similar to flip-chip soldering. Alternatively, the solder pads 121 of the first electrode 120 may be disposed on a side surface of the optoelectronic chip 100, the solder pads 231 of the second electrode 230 may be disposed on a wall in the installation recess 220 facing the solder pads 121 of the first electrode 120, and the first electrode 120 and second electrode 230 are electrically connected by means of soldering or an electrically conductive glue.

In the first embodiment, integration between the silicon photonic chip 200 and the optoelectronic chip 100 (the lithium niobate thin film modulator) is realized by a non-bonding method. The cover layer 244 on a surface of the silicon photonic chip 200 does not need to be made thin. Electrodes may still be made on the silicon photonic chip 200, and active devices such as a photodetector may further be manufactured on the silicon photonic chip 200, thus resolving the problem of insufficient bandwidth of a silicon-based modulator while maximally preserving advantages of the silicon photonic chip 200 in integrating passive and active devices, thereby improving the level of integration of the silicon photonic chip 200.

In the first embodiment, optical connection (not shown in the drawings) between the input segment of the second waveguide 210 on the silicon photonic chip 200 and the Y-shaped waveguide 112 at one end of the first waveguide 110 of the optoelectronic chip 100 is realized by means of photonic wire bonding (PWB), and optical connection between the Y-shaped waveguide 112 at the other end of the first waveguide 110 and the output segment of the second waveguide 210 is realized by means of photonic wire bonding. By realizing optical connection by means of photonic wire bonding, there is no requirement on the positions of the first waveguide 110 and the second waveguide 210. Therefore, in the first embodiment, the first waveguide 110 may or may not be aligned with the second waveguide 210, so there is no requirement on the position of the optoelectronic chip 100 in the installation recess 220, and thus requirement on the precision of the installation recess 220 is relatively low, making the manufacturing easy and significantly reducing the difficulty of the installation of the optoelectronic chip, thereby enabling an effective improvement in production efficiency.

Second Embodiment

Figure 3:
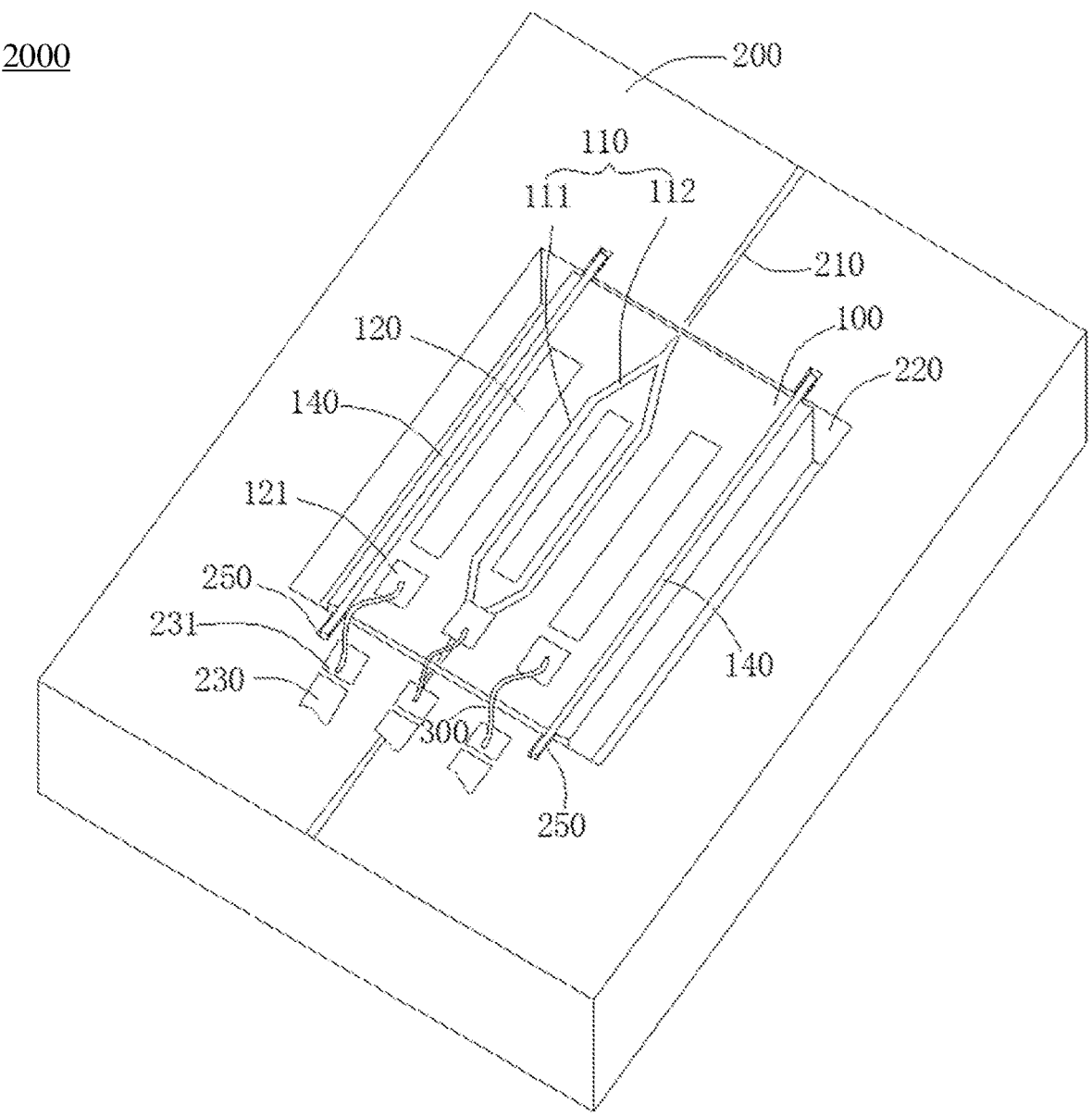
FIG. 3 is a structural diagram of a hybrid integrated optoelectronic chip according to a second embodiment of the present disclosure.
Figure 4:
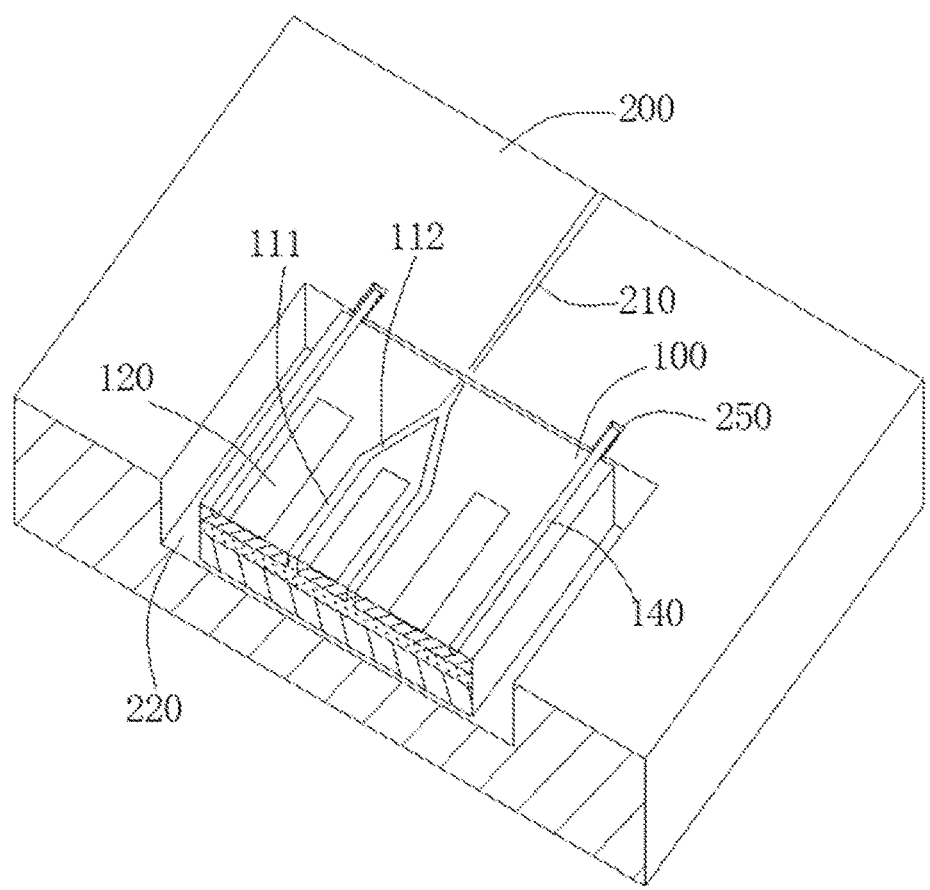
FIG. 4 is a cutaway view of a position-setting structure of the hybrid integrated optoelectronic chip in FIG. 3.

FIG. 3 is a structural diagram of a hybrid integrated optoelectronic chip 2000 according to a second embodiment of the present disclosure. FIG. 4 is a cutaway view of a position-setting structure of the hybrid integrated optoelectronic chip 2000 in FIG. 3. As illustrated in FIG. 3 and FIG. 4, the second embodiment differs from the first embodiment in that optical connection between the input segment of the second waveguide 210 on the silicon photonic chip 200 and the Y-shaped waveguide 112 at one end of the first waveguide 110 of the optoelectronic chip 100 is realized by means of a spot-size converter. For example, the spot-size converter can be disposed at a location where the input segment of the second waveguide 210 and the Y-shaped waveguide 112 at one end of the first waveguide 110 interface each other. Also, optical connection between the Y-shaped waveguide 112 at the other end of the first waveguide 110 and the output segment of the second waveguide 210 is also realized by means of a spot-size converter. For example, the spot-size converter can be disposed at a location where the Y-shaped waveguide 112 at the other end of the first waveguide 110 and the output segment of the second waveguide 210 interface each other. Alternatively, in another embodiment, a first spot-size converter and a second spot-size converter are disposed respectively at a portal of the input segment of the second waveguide 210 and a portal of the first waveguide 110 that face each other; and a third spot-size converter and a fourth spot-size converter are disposed respectively at a portal of the first waveguide 110 and a portal of the output segment of the second waveguide 210 that face each other. The first spot-size converter is connected to the second spot-size converter by means of a refractive index matching liquid, and the third spot-size converter is connected to the fourth spot-size converter by means of a refractive index matching liquid (not shown in the drawings). The realization of optical connection between the first waveguide on the optoelectronic chip and the second waveguide on the silicon photonic chip by means of spot-size converters in coordination with a refractive index matching liquid provides simplicity, quickness, and low cost.

Since spot-size converters are used to realize optical connection between the two waveguides, the first waveguide 110 needs to be aligned with the second waveguide 210. In the second embodiment, a first position-setting structure is disposed at two opposite ends of the optoelectronic chip 100. In other embodiments, alternatively, the first position-setting structure may be disposed on two sides of the optoelectronic chip 100 as needed. A second position-setting structure is further disposed on the silicon photonic chip 200. The first position-setting structure and the second position-setting structure engage to set the position of the optoelectronic chip 100 so that the first waveguide 110 is aligned with the second waveguide 210. In the second embodiment as illustrated in FIGS. 3 and 4, the first position-setting structure is two position-setting bars 140 disposed on an upper surface of the optoelectronic chip 100. Both position-setting bars 140 extend beyond end surfaces of the optoelectronic chip 100, and the direction in which the position-setting bars 140 extend is the same as the direction in which the first waveguide 110 extends. The second position-setting structure is four position-setting grooves 250 disposed on an upper surface of the silicon photonic chip 200 and configured to receive two end portions of each of the two position-setting bars 140, respectively. When the optoelectronic chip 100 is being installed into the installation recess 220, the end portions of the position-setting bars 140 are located in the position-setting grooves 250 to set the position of the optoelectronic chip 100 in the installation recess 220 so that the first waveguide 110 of the optoelectronic chip 100 is aligned with the second waveguide 210 of the silicon photonic chip 200. In the second embodiment, the position-setting grooves 250 are V-shaped grooves. In other embodiments, the position-setting grooves 250 may alternatively be U-shaped grooves, semicircle-shaped grooves, etc. In the second embodiment, the first position-setting structure is two position-setting bars 140 disposed on the upper surface of the optoelectronic chip 100, and the optoelectronic chip 100 is secured and installed into the installation recess 220 by means of adhering and securing the position-setting bars 140 into the position-setting grooves 250. In other embodiments, alternatively, there may be only one position-setting bar or a plurality of position-setting bars. Alternatively, the first position-setting structure may be a position-setting recess disposed at a side wall or end surface of the optoelectronic chip 100, the second position-setting structure may accordingly be a protruding edge of a side wall of the installation recess 220 of the silicon photonic chip 200, and the protruding edge and the position-setting recess engage to set the position of the optoelectronic chip 100 so that the first waveguide 110 is aligned with the second waveguide 210. In the second embodiment, a glue layer may be added between a bottom portion of the optoelectronic chip 100 and a bottom of the installation recess 220 to adhere the optoelectronic chip 100 into the installation recess 220, the optoelectronic chip 100 being partially or entirely embedded in the installation recess 220. In other embodiments, alternatively, glue may be placed between the optoelectronic chip 100 and a wall of the installation recess 220 to adhere the optoelectronic chip 100.

In the second embodiment, the optoelectronic chip 100 is a lithium niobate thin film modulator (herein after also referred to as "lithium niobate thin film modulator 100").

When the lithium niobate thin film modulator 100 is integrated onto the silicon photonic chip 200, optical connection between the first waveguide 110 on the lithium niobate thin film modulator 100 and the second waveguide 210 on the silicon photonic chip 200 is realized by means of spot-size converters. Precise alignment between the first waveguide 110 on the optoelectronic chip 100 and the second waveguide 210 on the silicon photonic chip 200 may be realized by means of configuring the aforementioned position-setting bars 140 and the position-setting grooves 250 to engage. In other embodiments, the aforementioned position-setting structures and methods of integration may also be used to integrate and align other optoelectronic chips with silicon photonic chips. In other words, the optoelectronic chip 100 is not limited to a lithium niobate thin film modulator, and the optoelectronic chip 100 may be a modulator of another material or another optoelectronic chip. These all fall within the scope of protection of the present disclosure. The use of the aforementioned position-setting structures for position-setting provides high alignment precision, the technology is readily implemented, and the operation is convenient and speedy, thus enabling an effective improvement in production efficiency.

Third Embodiment

The third embodiment provides a method of manufacturing the hybrid integrated optoelectronic chip 1000 illustrated in FIGS. 1 and 2. The method comprising the following steps:

forming the silicon photonic chip 200 and the optoelectronic chip 100, the optoelectronic chip 100 comprising at least one first waveguide 110, the silicon photonic chip comprising at least one second waveguide 210, the material of the optoelectronic chip 100 being different from the material of the silicon photonic chip 200;

forming the installation recess 220 on the aforementioned silicon photonic chip 200; and securing and installing the aforementioned optoelectronic chip 100 into the installation recess 220 so that the first waveguide 110 on the optoelectronic chip 100 is optically connected to the second waveguide 210 on the silicon photonic chip 200.

In the third embodiment, optical connection between the first waveguide 110 and the second waveguide 210 is realized by means of photonic wire bonding (PWB), so there is no requirement on the relative positions of the first waveguide 110 and the second waveguide 210. Therefore, in the third embodiment, the first waveguide 110 does not need to be aligned with the second waveguide 210, so there is no requirement on the position of the optoelectronic chip 100 in the installation recess 220, and thus requirement on the precision of the installation recess 220 is relatively low, making the manufacturing easy and significantly reducing the difficulty of the installation of the optoelectronic chip 100, thereby enabling an effective improvement in production efficiency.

The aforementioned method of forming the silicon photonic chip 200 and the optoelectronic chip 100 is one that uses a common semiconductor manufacturing technology for designing, manufacturing, and forming on a wafer. In the third embodiment, the optoelectronic chip 100 is a commonly used lithium niobate thin film modulator. The first waveguide 110 of the optoelectronic chip 100 comprises two modulation zone waveguides 111 in the middle and Y-shaped waveguides 121 at two ends of the modulation zone waveguides 111, and the first electrode 120 is GSG electrodes. The silicon photonic chip 200 has designed on it the second waveguide 210 configured to optically connect to the Y-shaped waveguides 112 of the first waveguide 110. The silicon photonic chip 200 may further have designed on it passive and active optical devices such as a wavelength division multiplexer, an optocouplers, and/or a photoelectric detector.

Fourth Embodiment

The fourth embodiment provides a method of manufacturing the hybrid integrated optoelectronic chip 2000 illustrated in FIGS. 3 and 4. The method comprising the following steps:

forming the silicon photonic chip 200 and the optoelectronic chip 100, the optoelectronic chip 100 comprising at least one first waveguide 110, and the silicon photonic chip 200 comprising at least one second waveguide 210;

forming the first position-setting structure on the optoelectronic chip 100, and forming the second position-setting structure and the installation recess 220 on the silicon photonic chip 200;

securing and installing the optoelectronic chip 100 into the installation recess 220 on the silicon photonic chip 200, the aforementioned first position-setting structure working in coordination with the second position-setting structure so that the first waveguide 110 and the second waveguide 210 are aligned with each other; and optically connecting the first waveguide 110 to the second waveguide 220.

In the fourth embodiment, the first position-setting structure comprises the position-setting bar 140 that protrudes beyond an edge of the optoelectronic chip 100, and the second position-setting structure comprises the position-setting groove 250 on the silicon photonic chip 200 near the installation recess 220. The position-setting bar 140 is partially embedded in the position-setting groove 250, and the position-setting bar 140 is secured in the position-setting groove 250 by application of glue in the position-setting groove 250. In the fourth embodiment, the position-setting groove 250 is a V-shaped groove. In other embodiments, the position-setting groove 250 may alternatively be a U-shaped groove, a semicircle-shaped groove, etc. The method of optically connecting the first waveguide 110 to the second waveguide 220, as mentioned above, is a method in which a spot-size converter works in coordination with a refractive index matching liquid to realize optical connection between the first waveguide 110 and the second waveguide 220. In other embodiments, alternatively, photonic wire bonding may be used to optically connect the first waveguide 110 to the second waveguide 210.

The optoelectronic chip 100 provided in the fourth embodiment is a lithium niobate thin film modulator comprising, stacked sequentially, a silicon dioxide base layer, a lithium niobate waveguide layer, a silicon dioxide cover layer, and a first electrode disposed in the silicon dioxide cover layer. Taking GSG electrodes as an example, the first electrode comprises at least one signal electrode and two ground electrodes. A first waveguide is disposed in the lithium niobate waveguide layer, the first waveguide comprising two modulation zone waveguides in the middle and Y-shaped waveguides at two ends. The silicon photonic chip 200 provided in the fourth embodiment comprises, in addition to the second waveguide optically connected to the first waveguide, a second electrode electrically connected to the first electrode. Electric power from an external power source and electrical signal passes through the second electrode on the silicon photonic chip to the first electrode on the lithium niobate thin film modulator, and electrical connection between the first electrode and the second electrode may be realized by means of gold wire bonding or solder joints. Moreover, alternatively, other passive and active devices, such as a waveguide based on a silicon optical bench, an optical connector, and a photodetector, may be disposed on the silicon photonic chip, as long as the location and space needed for the installation of the lithium niobate thin film chip are reserved as needed during design. In other words, the method of manufacturing the integrated chip may use a pre-manufactured silicon photonic chip and a pre-manufactured lithium niobate thin film chip, and the manufacturing of the silicon photonic chip and the manufacturing of the lithium niobate thin film chip may take place concurrently and may both be completed with currently available methods of manufacturing, thus requiring no special technology and having a lower cost. In other embodiments, the optoelectronic chip may alternatively be another complete chip, such as a modulator of another material, a wavelength division multiplexer, or a laser.

Figure 5:
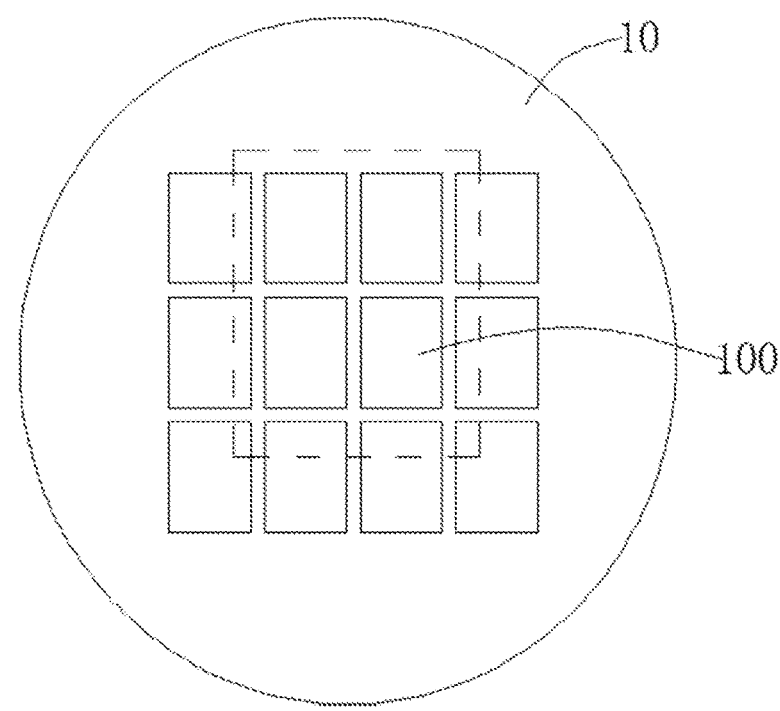
FIG. 5 is a diagram of a wafer including a plurality of optoelectronic chips, according to an embodiment of the present disclosure.
Figure 6:
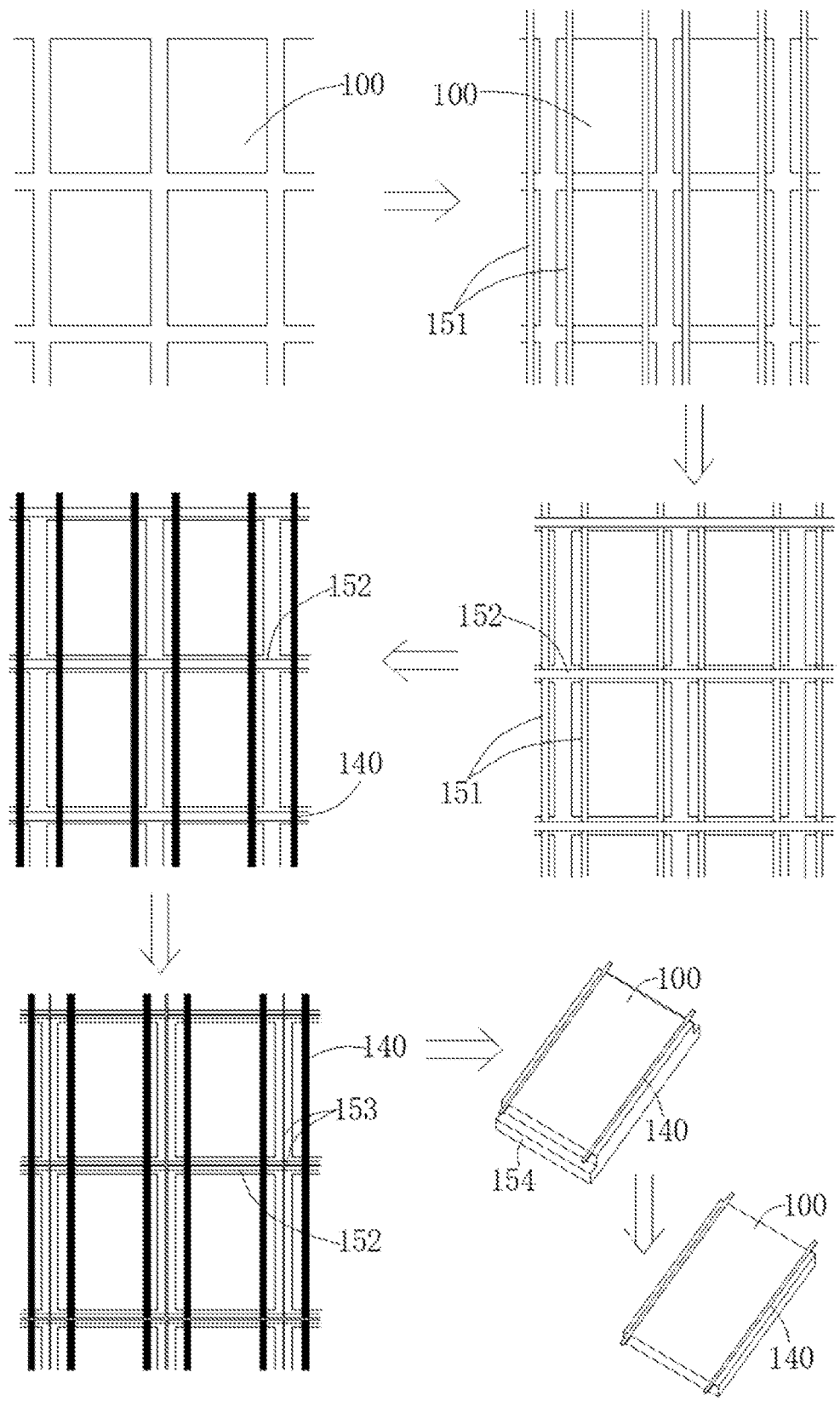
FIG. 6 is a diagram illustrating steps for manufacturing a position-setting bar on an optoelectronic chip, according to an embodiment of the present disclosure.

FIG. 5 is a diagram of a wafer 10 including a plurality of optoelectronic chips 100, according to an embodiment of the present disclosure. FIG. 6 is a diagram illustrating steps for manufacturing a position-setting bar on the optoelectronic chip 100, according to an embodiment of the present disclosure.

As illustrated in FIG. 5 and FIG. 6, in the present embodiment, the method of forming a first position-setting structure on the optoelectronic chip 100 comprises the following steps:

forming, on the wafer 10, the plurality of optoelectronic chips 100 arranged in an array (the internal structure of the chips is omitted in the drawings);

forming, on a surface of the wafer 10, a plurality of accommodating grooves 151 (also referred to as "first grooves") that extend through the plurality of optoelectronic chips 100, and forming deep grooves 152 (also referred to as "second grooves") between two adjacent optoelectronic chips 100 on the wafer 100, (e.g., wet etching technology may be used to form the accommodating groove 151 and then deep etching may be used to form the deep groove 152), the direction in which the accommodating grooves 151 extend being the same as the direction in which the first waveguides 110 in the plurality of optoelectronic chips 100 extend, the direction in which the deep grooves 152 extend being orthogonal to the direction in which the accommodating grooves 151 extend, and the depth of the deep groove 152 being greater than the depth of the accommodating groove 151;

placing and securing the position-setting bars 140 into the accommodating grooves 151; and dividing the aforementioned wafer 100 to form separate optoelectronic chips 100.

In the present embodiment, each position-setting bar 140 may be a pre-made silicon bar, a pre-made silicon dioxide bar, etc. and is secured into the corresponding accommodating groove 151 by glue. Each accommodating groove 151 may be a V-shaped groove. In other embodiments, each accommodating groove 151 may alternatively be a U-shaped groove, a semicircle-shaped grooves, etc.

After dividing the aforementioned wafer 100, in each optoelectronic chip 100, a bottom of the aforementioned deep groove 152 forms a stair 154 located at an end surface of the optoelectronic chip 100. The stair 154 is located below the position-setting bar 140. Therefore, the method of forming the first position-setting structure on the optoelectronic chip 100 further comprises, after the step of dividing the aforementioned wafer 10 to form separate optoelectronic chips, removing the stair 154 below the position-setting bar 140 of the optoelectronic chip 100. In other words, the bottom of the deep groove 152 forms stairs 154 at two ends of the separated optoelectronic chip 100. In the present embodiment, the stairs 154 are removed by means of thinning a substrate of each optoelectronic chip 100 along a surface of the stair 154 to form a thin film chip used for integration.

In other embodiments, the method of forming the first position-setting structure on the optoelectronic chip 100 may alternatively be performed directly on the separated optoelectronic chips and comprise the following steps: etching two accommodating grooves on an upper surface of the optoelectronic chip 100, the accommodating grooves connecting and extending through two end surfaces of the optoelectronic chip and extending in the same direction in which the first waveguide extends; and placing and securing position-setting bars into the accommodating grooves, the position-setting bars extending beyond ends of the optoelectronic chip.

Figure 7:
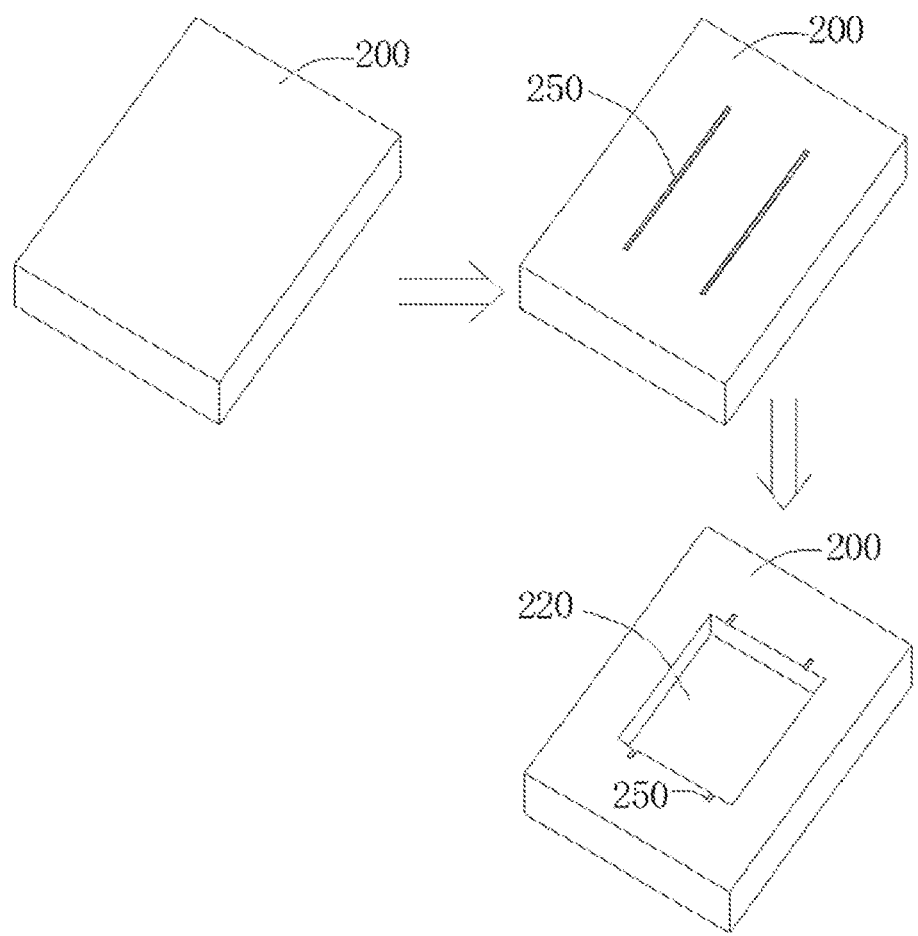
FIG. 7 is a diagram illustrating steps for manufacturing a position-setting groove and an installation recess on a silicon photonic chip according to an embodiment of the present disclosure.

FIG. 7 is a diagram illustrating steps for manufacturing the position-setting groove 250 and the installation recess 220 on the silicon photonic chip 200, according to an embodiment of the present disclosure. As illustrated in FIG. 7, in the step of forming a second position-setting structure and the installation recess 220 on the silicon photonic chip 200, etching may be used to form the position-setting groove 250 and the installation recess 220, which comprises the following steps: forming, by wet etching and at a location where the optoelectronic chip 100 is planned to be installed onto the silicon photonic chip 200, two position-setting grooves 250 being configured to receive end portions of two position-setting bars 140 of the optoelectronic chip 100; and forming a deeply etched installation recess 220 on the silicon photonic chip 200 by isotropic dry etching, the installation recess 220 covering over the two position-setting grooves 250 and dividing the two position-setting grooves 250 into four segments that are distributed on two ends of the installation recess 220.

Figure 8:
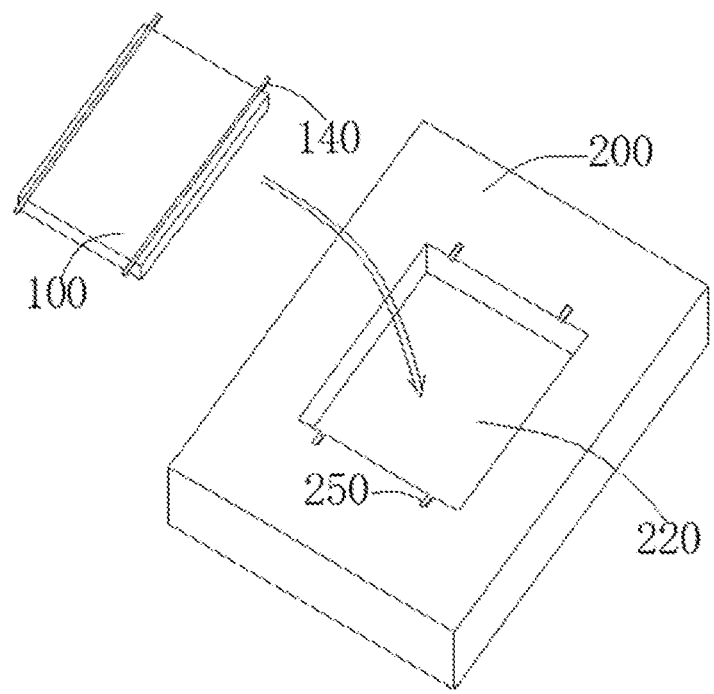
FIG. 8 is an exploded view of an optoelectronic chip and a silicon photonic chip, according to an embodiment of the present embodiment.

FIG. 8 is an exploded view of the optoelectronic chip 100 and the silicon photonic chip 200, according to an embodiment of the present embodiment. As illustrated in FIG. 8, when installing the optoelectronic chip 100 into the installation recess 220 of the silicon photonic chip 200, four end portions of the two position-setting bars 140 on the optoelectronic chip 100 fit into the four segments of position-setting grooves 250 at the two ends of the installation recess 220 to set the position of the optoelectronic chip 100 in the installation recess 220, including the depth and horizontal position of the optoelectronic chip 100 going into the installation recess 220, so that the first waveguide on the optoelectronic chip 100 is precisely aligned with the second waveguide on the silicon photonic chip 200. For illustrative purpose, the description above describes the installation of the optoelectronic chip 100 to a single silicon photonic chip 200. In other embodiments, alternatively, a plurality of the optoelectronic chips may respectively be installed onto a plurality of the silicon photonic chips on a silicon wafer, and then all of the silicon photonic chips are cut and separated. In other words, the method of manufacturing at the wafer level also falls within the scope of protection of the present disclosure. In this method of manufacturing, the manufacturing of the position-setting bars on the optoelectronic chip and the manufacturing of the position-setting grooves and installation recess on the silicon photonic chip are two steps that may be performed concurrently, thus reducing manufacturing time and further improving production efficiency.

In the present embodiment, at least one first electrode is disposed on the aforementioned optoelectronic chip 100, such as a lithium niobate thin film modulator, and at least one second electrode is disposed on the silicon photonic chip 200. The aforementioned method of manufacturing further comprises, after the step of securing the optoelectronic chip 100 into the installation recess 220 of the silicon photonic chip 200, electrically connecting the first electrode to the second electrode by means of gold wire bonding. In other embodiments, alternatively, methods such as flip-chip soldering, electrically conductive glue, or solder joints may be used to realize electrical connection between the first electrode and the second electrode. The method of securing and installing the optoelectronic chip 100 into the installation recess 220 of the silicon photonic chip 200, as mentioned above, is realized by securing the position-setting bar by glue application in the second position-setting structure of the silicon photonic chip 200, and the second position-setting structure comprises the position-setting groove formed on the silicon photonic chip 200 near the installation recess 220. In other embodiments, alternatively, glue may be placed between the optoelectronic chip 100 and a bottom or a wall of the installation recess 220, and the glue is cured to secure the optoelectronic chip 100, thus further securing the optoelectronic chip 100 and avoiding the optoelectronic chip 100 from moving out of place in the process of transportation or use, thereby improving the reliability of a product.

In all of the embodiments above, for illustrative purpose, the shape of the front view (upper surface) of the optoelectronic chip 100 is a rectangle. In other embodiments, the front view of the optoelectronic chip may alternatively be a circle, another polygon, or another shape.

Embodiments of the present disclosure improve a method of integrating a silicon photonic chip with a chip of another material and realize the integration of a silicon photonic chip with a chip of another material using a non-bonding method, thereby addressing the problem of insufficient bandwidth in a silicon-based modulator while maximally preserving advantages of a silicon photonic chip in integrating passive and active devices, increasing the level of integration for chips, and enabling easier manufacturing and an effective improvement in production efficiency.

The series of detailed descriptions above is only intended to provide specific descriptions of feasible embodiments of the present disclosure. They are not to be construed as limiting the scope of protection of the present disclosure. All equivalent embodiments or changes that are not detached from the technology of the present disclosure in essence should fall under the scope of protection of the present disclosure.

What is claimed is:

1. A hybrid integrated optoelectronic chip, comprising:
   an optoelectronic chip comprising a lithium niobate thin film optical modulator, the thin film optical modulator comprising at least one first waveguide formed of lithium niobate; and
   a silicon photonic chip comprising at least one second waveguide and an installation recess formed on an upper surface of the silicon photonic chip,
   wherein the optoelectronic chip is installed in the installation recess, and the first waveguide is optically connected to the second waveguide,
   the optoelectronic chip includes a bottom surface facing a bottom of the installation recess and an upper surface opposite to the bottom surface, at least one first electrode is disposed on the upper surface of the optoelectronic chip,
at least one second electrode is disposed on the upper surface of the silicon photonic chip, and
the first electrode is electrically connected to the second electrode.

2. The hybrid integrated optoelectronic chip of claim 1, wherein
a first position-setting structure is disposed on the optoelectronic chip, a second position-setting structure is disposed on the silicon photonic chip, and the first position-setting structure and the second position-setting structure engage to set a position of the optoelectronic chip relative to the silicon photonic chip.

3. The hybrid integrated optoelectronic chip of claim 2, wherein
the first position-setting structure comprises at least one position-setting bar, and the second position-setting structure comprises a position-setting groove that is configured to receive an end portion of the position-setting bar.

4. The hybrid integrated optoelectronic chip of claim 3, wherein
the position-setting bar is located on the upper surface of the optoelectronic chip, the position-setting groove is located the an upper surface of the silicon photonic chip, and
the end portion of the position-setting bar is located in the position-setting groove so that the first waveguide of the optoelectronic chip is aligned with the second waveguide of the silicon photonic chip.

5. The hybrid integrated optoelectronic chip of claim 4, further comprising:
a spot-size converter, disposed at a location where the second waveguide and first waveguide interface each other, to optically couple the second waveguide to the first waveguide.

6. The hybrid integrated optoelectronic chip of claim 1, wherein a glue layer is disposed between the optoelectronic chip and a bottom or a wall of the installation recess, and the glue layer is configured to adhere the optoelectronic chip into the installation recess.

7. The hybrid integrated optoelectronic chip of claim 1, wherein
optical connection between the second waveguide and the first waveguide is realized by means of photonic wire bonding.

8. The hybrid integrated optoelectronic chip of claim 1, wherein a passive optical device and/or an active optical device is disposed on the silicon photonic chip.

9. A hybrid integrated optoelectronic chip, comprising:
an optoelectronic chip comprising a lithium niobate thin film optical modulator, the thin film optical modulator comprising at least one first waveguide formed of lithium niobate;
a silicon photonic chip comprising at least one second waveguide and an installation recess formed on an upper surface of the silicon photonic chip;
wherein
the optoelectronic chip is installed in the installation recess formed on the upper surface of the silicon photonic chip,
the optoelectronic chip includes a bottom surface facing a bottom of the installation recess and an upper surface opposite to the bottom surface,
a first position-setting structure is disposed on the upper surface of the optoelectronic chip, and a second position-setting structure is disposed on the upper surface of the silicon photonic chip, and
the first position-setting structure and the second position-setting structure engage to set the position of the optoelectronic chip so that the first waveguide is aligned with the second waveguide.

10. The hybrid integrated optoelectronic chip of claim 9, wherein the first position-setting structure comprises at least one position-setting bar, the second position-setting structure comprises a position-setting groove that is configured to receive an end portion of the position-setting bar, and
the position-setting bar is secured into the position-setting groove.

11. The hybrid integrated optoelectronic chip of claim 9, wherein a glue layer is disposed between the optoelectronic chip and a bottom or a wall of the installation recess to adhere the optoelectronic chip into the installation recess.

12. The hybrid integrated optoelectronic chip of claim 9, wherein at least one first electrode is disposed on the optoelectronic chip, at least one second electrode is disposed on the silicon photonic chip, and the first electrode is electrically connected to the second electrode.

13. A method of manufacturing a hybrid integrated optoelectronic chip, the method of manufacturing comprising:
forming a silicon photonic chip and an optoelectronic chip, the optoelectronic chip comprising a lithium niobate thin film optical modulator, the optoelectronic chip comprising at least one first waveguide formed of lithium niobate and at least one first electrode disposed on an upper surface of the optoelectronic chip, the silicon photonic chip comprising at least one second waveguide and at least one second electrode disposed on an upper surface of the silicon photonic chip, a material of the optoelectronic chip being different from a material of the silicon photonic chip;
forming an installation recess on the upper surface of the silicon photonic chip;
securing and installing the optoelectronic chip into the installation recess so that a bottom surface of the optoelectronic chip faces a bottom of the installation recess, and the first waveguide is optically connected to the second waveguide, wherein the bottom surface of the optoelectronic chip is opposite to the upper surface of the optoelectronic chip; and
electrically connecting the at least one first electrode to the second electrode by means of gold wire bonding.

14. A method of manufacturing a hybrid integrated optoelectronic chip, the method of manufacturing comprising:
forming a silicon photonic chip and an optoelectronic chip, the optoelectronic chip comprising a lithium niobate thin film optical modulator, the thin film optical modulator comprising at least one first waveguide formed of lithium niobate, the silicon photonic chip comprising at least one second waveguide;
forming a first position-setting structure on an upper surface of the optoelectronic chip;
forming a second position-setting structure and an installation recess on an upper surface of the silicon photonic chip;
securing and installing the optoelectronic chip into the installation recess, a bottom surface of the optoelectronic chip facing a bottom of the installation recess, the first position-setting structure engaging with the second position-setting structure so that the first waveguide and the second waveguide are aligned with each other; and optically connecting the first waveguide to the second waveguide.

15. The method of manufacturing of claim 14, wherein the forming of the first position-setting structure on the optoelectronic chip comprises the following steps:
   forming an accommodating groove on the optoelectronic chip; and
   placing and securing a position-setting bar into the accommodating groove, the position-setting bar extending beyond an end of the optoelectronic chip.

16. The method of manufacturing of claim 14, wherein the forming of the first position-setting structure on the optoelectronic chip comprises the following steps:
   forming, on a wafer, a plurality of optoelectronic chips arranged in an array;
   forming, on a surface of the wafer, a plurality of first grooves that extend through the plurality of optoelectronic chips, and forming a plurality of second grooves between adjacent optoelectronic chips on the wafer, a direction in which the second grooves extend being orthogonal to a direction in which the first grooves extend, and a depth of the second groove being greater than a depth of the first groove;
   placing and securing a position-setting bar into each one of the first grooves; and
   dividing the wafer to form separate optoelectronic chips.

17. The method of manufacturing of claim 16, wherein after dividing the wafer, in each optoelectronic chip, a bottom of the second groove forms a stair located at an end surface of the optoelectronic chip, and the stair is located below the position-setting bar,
   the method of manufacturing further comprising, after dividing the wafer to form separate optoelectronic chips, removing the stair below the position-setting bar of each optoelectronic chip.

18. The method of manufacturing of claim 14, wherein the method of manufacturing further comprises, after the securing and installing of the optoelectronic chip into the installation recess, electrically connecting the optoelectronic chip to the silicon photonic chip by means of gold wire bonding, flip-chip soldering, electrically conductive glue, or solder joints.

19. The method of manufacturing of claim 14, wherein the securing and installing of the optoelectronic chip into the installation recess is realized by securing the first position-setting structure by glue application in the second position-setting structure of the silicon photonic chip, and
   the second position-setting structure comprises a position-setting groove formed on the silicon photonic chip and extending from the installation recess.

20. The method of manufacturing of claim 14, wherein the securing and installing of the optoelectronic chip into the installation recess comprises placing glue between the optoelectronic chip and a bottom or a wall of the installation recess, and curing the glue to adhere the optoelectronic chip into the installation recess.

* * * * *